United States Patent
Kolesnikov et al.

(10) Patent No.: US 8,621,228 B2
(45) Date of Patent: Dec. 31, 2013

(54) MAC AGGREGATION RESILIENT TO DENIAL-OF-SERVICE ATTACKS FOR USE IN A MULTI-NODE DATA NETWORK

(75) Inventors: Vladimir Y. Kolesnikov, Jersey City, NJ (US); Wonsuck Lee, Basking Ridge, NJ (US)

(73) Assignee: Alcatel Lucent, Paris (FR)

( * ) Notice: Subject to any disclaimer, the term of this patent is extended or adjusted under 35 U.S.C. 154(b) by 0 days.

(21) Appl. No.: 13/237,498

(22) Filed: Sep. 20, 2011

(65) Prior Publication Data

US 2012/0284523 A1  Nov. 8, 2012

Related U.S. Application Data

(60) Provisional application No. 61/481,892, filed on May 3, 2011.

(51) Int. Cl.
*H04L 29/06* (2006.01)
*G06F 21/00* (2013.01)

(52) U.S. Cl.
USPC ............................................ 713/181; 726/3

(58) Field of Classification Search
None
See application file for complete search history.

(56) References Cited

U.S. PATENT DOCUMENTS

2004/0088293 A1* 5/2004 Daggett ........................... 707/6
2007/0071021 A1 3/2007 Girao

OTHER PUBLICATIONS

Bartoli A. et al: "Secure Lossless Aggregation for Smart Grid M2M Networks". Smart Grid Communications (SmartGridComm), 2010 First IEEE International Conference on, IEEE, Piscataway, NJ, USA, Oct. 4, 2010, pp. 333-338, XP031790247, ISBN:978-1-4244-6510-1.
Julia Albath et al: "Secure Hierarchical Data Aggregation in Wireless Sensor Networks", Wireless Communications and Networking Conference, 2009. WCNC 2009. IEEE, IEEE, Piscataway, NJ, USA, Apr. 5, 2009, pp. 1-6, XP031454454, ISBN: 978-1-4244-2947-9.
International Search Report; Jul. 4, 2012.
Aggregate Message Authentication Codes; Jonathan Katz and Andrew Y. Lindell; pp. 155-169.
History-Free Aggregate Message Authentication Codes; Oliver Eikemeier, MArch Fischlin, Jensa-Fabian Gozmann, Anja Lehmann, Dominique Schroder, Peter Schroder, Daniel Wagner; Darmstadt University of Tecnnology, Germany; pp. 1- 26.

* cited by examiner

*Primary Examiner* — Gilberto Barron, Jr.
*Assistant Examiner* — Malcolm Cribbs
(74) *Attorney, Agent, or Firm* — S. R. Santema (57) ABSTRACT

An improved MAC aggregation technique is disclosed that yields an aggregate MAC much shorter than the concatenation of constituent MACs while achieving improved resilience to denial-of-service (DoS) attacks. The aggregate MAC is constructed in a manner wherein upon instance of channel impairments or malicious attack (e.g., from a rogue node or man-in-the-middle attacker), only a portion of the aggregate MAC will include corrupted data, at least a portion of the aggregate MAC thereby including valid verifiable data. A source of corruption of the aggregate MAC may be ascertained based on indicia of which constituent MACs are included in the valid portion; and constituent MACs that are wholly included in the valid portion may be declared valid.

8 Claims, 5 Drawing Sheets

MAC AGGREGATION RESILIENT TO DENIAL-OF-SERVICE ATTACKS FOR USE IN A MULTI-NODE DATA NETWORK

FIELD OF THE INVENTION

This invention relates generally to data security and, more particularly, to techniques for aggregation of message authentication codes for use in multi-node data networks.

BACKGROUND OF THE INVENTION

A message authentication code (MAC, or MAC "tag") is a digital signal sequence used for authenticating a message exchanged between a sender and receiver each having a shared secret "key." In a typical MAC authentication scenario, the sender of a message runs it through a cryptographic hash function having the message and the secret key as inputs, yielding a MAC tag as an output. The sender then sends the message and the tag to the receiver. The receiver runs the received message through the same MAC algorithm using the same key, yielding a second MAC tag. The receiver then compares the tag generated by itself to the tag received from the sender and if they are the same, the message is deemed authentic. If they are not the same, it is an indication that the message was altered or compromised in some manner during the exchange.

Although MAC tags are relatively short, they can represent a significant overhead in data networks that include multiple nodes generating multiple messages and hence, multiple different MAC tags. This overhead is most pronounced when the MAC tags are larger than the messages themselves. As one example, distributed sensor networks (such as "Smart Grid" energy metering networks) rely on a multitude of deployed cheap sensors to report measurements, such as temperature, electricity consumption, etc. This data is transmitted hop-by-hop over multiple nodes and needs to be authenticated and verified by a central node. The measurement data can be quite small (e.g., on the order of 10-15 bits), whereas the typical MAC tag is 128 bits which is roughly an order of magnitude larger than the data it authenticates.

To mitigate the overheads inherent in multi-node data networks, the concept of aggregate MACs (comprising an aggregation of multiple MAC tags into a shorter tag) has been proposed by the cryptographic community. Aggregate MACs are much shorter than the concatenation of constituent MACs, thus greatly reducing the network overhead, yet can still be verified by a central node that shares a distinct key with each sending node. However, existing MAC aggregation techniques produce tags that are vulnerable to denial-of-service (DoS) attacks, where a rogue node or man-in-the-middle attacker can easily disrupt the entire set of MACs, and hence prevent using all of the transmitted data. Accordingly, there is a need for improved MAC aggregation techniques that not only greatly reduce the overhead of a multi-node data network, but that shows a strong resilience to denial-of-service (DoS) attacks. Embodiments of the present invention are directed to addressing this need.

SUMMARY OF THE INVENTION

Generally, embodiments of the present invention describe an improved MAC aggregation technique that not only greatly reduces the network overhead, but also shows a strong resilience to denial-of-service (DoS) attacks.

In one embodiment, there is provided a MAC aggregation method carried out by a sending node in a communication network including a plurality of successive sending nodes operably linked to a control node. The method comprises receiving from a previous node a first message authentication code (MAC); generating a second message authentication code (MAC); executing a MAC aggregation function to combine the first and second MACs, yielding an aggregate MAC; and sending the aggregate MAC to a next consecutive node for use in deriving a next instance of aggregate MAC, or if the next consecutive node is the control node, for use in authenticating data originated from the sending nodes; wherein upon instance of the first MAC including corrupted data, the aggregate MAC is constructed in a manner in which only a portion of the aggregate MAC will include corrupted data, at least a portion of the aggregate MAC thereby including valid verifiable data.

In one embodiment, there is provided an apparatus for performing MAC aggregation of constituent MACs, the apparatus at a sending node comprising an input interface, an output interface, a memory and a processor. The processor is operably coupled to the input interface, output interface and memory and configured to: (a) receive from a previous node a first message authentication code (MAC); (b) generate a second message authentication code (MAC); (c) execute a MAC aggregation function to combine the first and second MACs, yielding an aggregate MAC; and (d) send the aggregate MAC to a next consecutive node for use in deriving a next instance of aggregate MAC, or if the next consecutive node is the control node, for use in authenticating data originated from the sending nodes; wherein upon instance of the first MAC including corrupted data, the aggregate MAC is constructed in a manner in which only a portion of the aggregate MAC will include corrupted data, at least a portion of the aggregate MAC thereby including valid verifiable data.

In one embodiment, there is provided a MAC aggregation method carried out by a control node in a communication network including a plurality of successive sending nodes operably linked to a control node. The method comprises receiving from a previous node a message string including payload data from a plurality of sending nodes and at least one aggregate MAC computed by aggregating a plurality of constituent MACs generated by the respective sending nodes; executing a MAC computation function to recompute the constituent MACs from the payload data and one or more shared secret keys, yielding a plurality of recomputed constituent MACs; executing a MAC aggregation function on the recomputed constituent MACs, yielding a computed aggregate MAC; comparing the computed aggregate MAC to the received aggregate MAC to determine an authentication status of the received aggregate MAC; if the computed aggregate MAC is not equal to the received aggregate MAC: identifying a valid portion and an invalid portion of the received aggregate MAC; estimating a source of corruption of the received aggregate MAC, based on indicia of which constituent MACs are included in the valid portion; and declaring valid the constituent MACs that are wholly included in the valid portion.

In one embodiment, there is provided an apparatus for performing MAC aggregation of constituent MACs, the apparatus at a control node comprising a communication interface, a memory and a processor. The processor is operably coupled to the communication interface and memory and configured to: (a) receive from a previous node a message string including payload data from a plurality of sending nodes and at least one aggregate MAC computed by aggregating a plurality of constituent MACs generated by the respective sending nodes; (b) execute a MAC computation function to recompute the constituent MACs from the payload data and one or more shared secret keys, yielding a plurality of recomputed constituent MACs; (c) execute a MAC aggregation function on the recomputed constituent MACs, yielding a computed aggregate MAC; (d) compare the computed aggregate MAC to the received aggregate MAC to determine an authentication status of the received aggregate MAC; (e) if the computed aggregate MAC is not equal to the received aggregate MAC: (e1) identify a valid portion and an invalid portion of the received aggregate MAC; (e2) estimate a source of corruption of the received aggregate MAC, based on indicia of which constituent MACs are included in the valid portion; and (e3) declare valid the constituent MACs that are wholly included in the valid portion.

BRIEF DESCRIPTION OF THE DRAWINGS

The foregoing and other advantages of the invention will become apparent upon reading the following detailed description and upon reference to the drawings in which.

DESCRIPTION OF THE PREFERRED EMBODIMENT(S)

Figure 1:
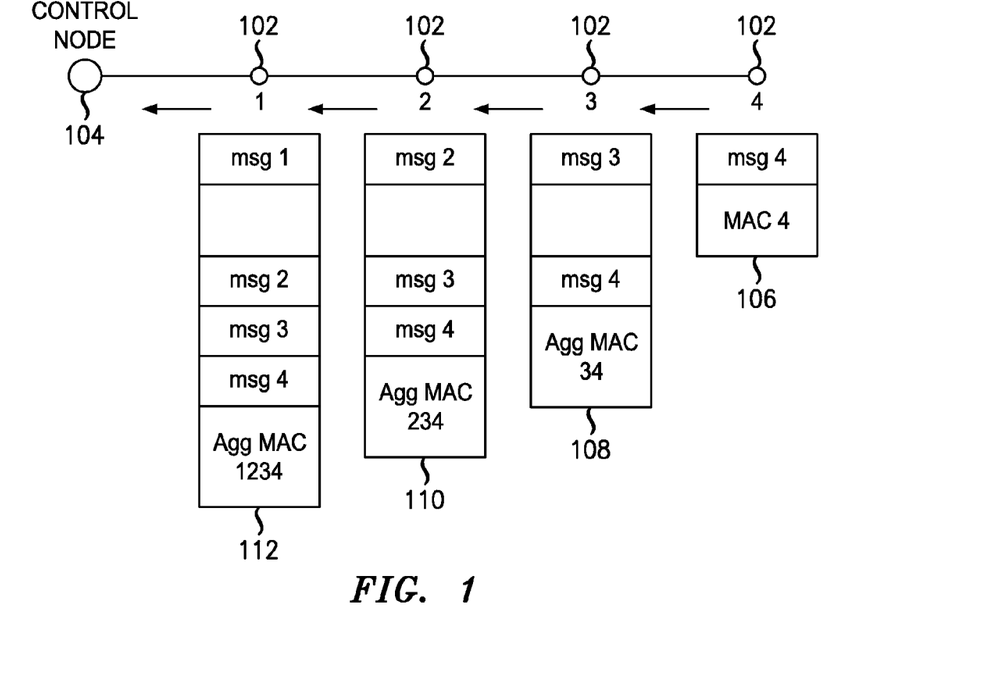
FIG. 1 illustrates an exemplary message sequence in a multi-node data network utilizing MAC aggregation.

FIG. 1 illustrates an exemplary message sequence in a multi-node data network 100 utilizing MAC aggregation. The multi-node data network 100 includes a plurality of sending nodes 102 (four shown) operably connected to a control node 104. For convenience, the sending nodes 102 are identified as "node 1," "node 2," "node 3" and "node 4" in relation to their proximity to the control node 102. The sending nodes may comprise, generally, any system, server, router, application or function adapted to communicate data with other nodes of the multi-node data network 100. The control node may comprise, generally, any system, server, router, application or function adapted to receive and authenticate data received from the sending nodes.

Most typically, the sending nodes and the control node reside in separate physical devices or structures distributed throughout the network 100. For example and without limitation, the sending nodes may comprise or be associated with multiple sensors deployed throughout a sensor network (such as a "Smart Grid" energy metering network) and the control node may comprise an energy monitoring and/or billing system, server or application that receives and authenticates the sensor data. As will be appreciated, the sending nodes and the control node are functional elements that may embody generally any data networking modality, may be arranged in alternative network topologies and may be distributed and/or combined among generally any combination of physical devices or structures.

In the example network of FIG. 1, the sending nodes 4, 3, 2, 1 are linked together in sequence and communicate successively ("hop-by-hop") to the control node. For purposes of illustration, it is presumed that the outermost sending node (node 4) has initiated a message ("msg 4") to be transported through the multi-node network 100. Node 4 develops a message string 106 including the message ("msg 4") and a message authentication code ("MAC 4") and sends the message string 106 to the next successive node (node 3). In one embodiment, MAC 4 is computed in conventional fashion, by running msg 4 through a cryptographic hash function having msg 4 and a shared secret key (shared by node 4 and the central node) as inputs, yielding the tag "MAC 4" as an output.

Node 3 generates its own message ("msg 3") and computes its own associated message authentication code ("MAC 3") and, having received message string 106 including MAC 4, executes a MAC aggregation function to combine MAC 3 and MAC 4 yielding an aggregate MAC ("AggMAC$_{34}$"). The MAC aggregation function will be described in greater detail in relation to FIG. 3. Node 3 develops a message string 108 including its own message ("msg 3") and the message from node 4 ("msg 4") and the aggregate MAC ("AggMAC$_{34}$"), and sends the message string 108 to the next successive node (node 2).

Node 2 generates its own message ("msg 2") and associated message authentication code ("MAC 2") and, having received message string 108 including AggMAC$_{34}$, executes a MAC aggregation function to derive a next instance of aggregate MAC ("AggMAC$_{234}$") based on a combination of MAC 2 and AggMAC$_{34}$. Node 2 develops a message string 110 including its own message ("msg 2") and the messages from node 3 ("msg 3") and node 4 ("msg 4") and the aggregate MAC ("AggMAC$_{234}$"), and sends the message string 110 to the next successive node (node 1).

Node 1 generates its own message ("msg 1") and associated message authentication code ("MAC 1") and, having received message string 110 including AggMAC$_{234}$, executes a MAC aggregation function to derive a next instance of aggregate MAC ("AggMAC$_{1234}$") based on a combination of MAC 1 and AggMAC$_{234}$. Node 1 develops a message string 112 including its own message ("msg 1") and the messages from node 2 ("msg 2"), node 3 ("msg 3") and node 4 ("msg 4") and the aggregate MAC ("AggMAC$_{1234}$"), and sends the message string 110 to the control node 104.

The control node 104, having received the message string 110 including payload data from the previous nodes and possession of the respective shared secret keys, recomputes the constituent MACs ("MAC 1," "MAC 2," "MAC 3" and "MAC 4"). Further, having knowledge of the network topology, the control node executes a MAC aggregation function on the recomputed constituent MACs (i.e., in the same sequence executed by the constituent nodes) to produce a computed aggregate MAC ("AggMAC$_{1234}$"). The control node then compares the computed aggregate MAC to the received aggregate MAC to determine an authentication status of the received aggregate MAC. If the computed aggregate MAC is equal to the received aggregate MAC, the received aggregate MAC is deemed valid and the constituent MACs from which the aggregate MAC was derived are known to be valid. Conversely, if the computed aggregate MAC and received aggregate MAC are not the same, it is an indication that some form of data impairment occurred in the network, either accidentally or maliciously.

In MAC aggregation techiques of the prior art, any such data impairments will disrupt the entire aggregate MAC, and no information can be derived from which the source of data impairment can be ascertained. In contrast, according to embodiments of the present invention, the aggregate MAC is constructed in a manner in which only a portion of the aggregate MAC will include corrupted data and at least a portion will include valid verifiable data. Advantageously, a source of corruption of the received aggregate MAC may be identified based on indicia of which constituent MACs are included in the valid portion; and the control node may declare valid any of the constituent MACs that are wholly included in the valid portion. This contrast is best observed with reference to FIG. 2 and FIG. 3.

Figure 2:
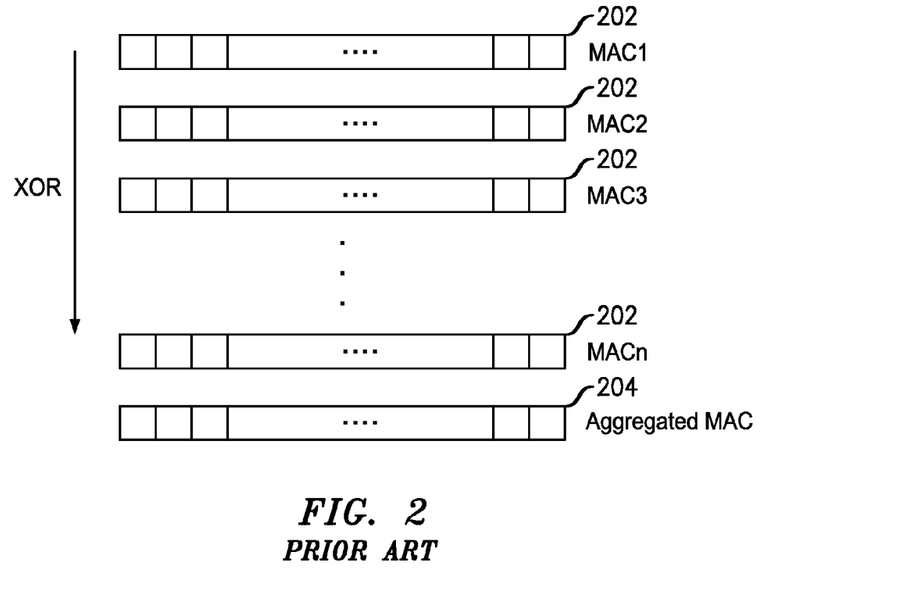
FIG. 2 illustrates a MAC aggregation function according to the prior art.

Referring initially to FIG. 2, a MAC aggregation function according to the prior art comprises a bitwise exclusive OR (XOR) operation on successive MACs 202 (e.g., MAC 1, MAC 2 . . . MAC n), yielding an aggregate MAC 204. A bitwise XOR function operates on two bit patterns of equal length and performs the logical XOR operation on each pair of corresponding bits. The resulting bit pattern is of equal length and the bit in any position is 1 if the corresponding bits are different (i.e., if only one of the first bit or second bit is 1 and the other of the first and second bit is 0) or 0 if the corresponding bits are the same (i.e., both are 1 or both are 0). The MAC aggregation function shown in FIG. 2 will therefore result in an aggregate MAC 204 that is equal in length to the constituent MACs 202 with a bit pattern derived by the constituent MACs. It is apparent that should any of the constituent MACs be corrupted either accidentally or maliciously, the resulting aggregate MAC will corrupted and there is no information in the aggregate MAC from which one can determine the source of the disruption.

Figure 3:
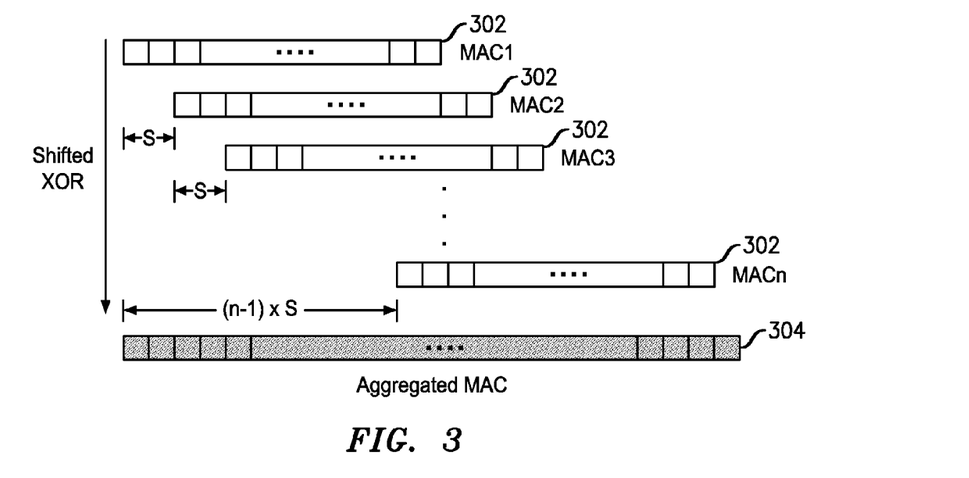
FIG. 3 illustrates an exemplary MAC aggregation function according to embodiments of the present invention.

Now referring now to FIG. 3, a MAC aggregation function according to embodiments of the present invention comprises a "shifted bitwise XOR" operation on successive MACs. In the shifted bitwise XOR operation, each successive MAC 302 (e.g., MAC 1, MAC 2 . . . MAC n) is shifted by a certain number of bits, s (forming a "staircase" configuration) with each successive MAC being bitwise XOR-ed with the previous MAC (or previous aggregated MAC) to generate an aggregated MAC 304 that is slightly longer ((n−1)×s longer) than an individual MAC.

For example, referring to the example network of FIG. 1, a shifted bitwise XOR operation executed initially on the constituent MACs 4, 3, 2, 1 (presuming 128-bit constituent MAC length and a shift s=8 bits) will yield:

at node 3, $AggMAC_{34}$ (formed by XOR-ing MAC 4 with a shifted MAC 3) will have a length of 136 bits;

at node 2, $AggMAC_{234}$ (formed by XOR-ing $AggMAC_{34}$ with a shifted MAC 2) will have a length of 144 bits;

at node 1, $AggMAC_{1234}$ (formed by XOR-ing $AggMAC_{234}$ with a shifted MAC 1) will have a length of 152 bits.

Generally, the contribution of any individual MAC (e.g., MAC 1, MAC 2 . . . MAC n) is only combined with a small number of other individual MACs (to be exact, with c=[128/s]−1 of them). Therefore, for example, an attacker inserted at the edge of the network can disrupt reports of only c other sensors. Thus, it is apparent that should any of the constituent MACs be corrupted either accidentally or maliciously, such data impairments will not disrupt the entire aggregate MAC, and (provided a sufficiently large number of nodes and/or a sufficiently large shift s) information can be derived from which the source of data impairment can be ascertained. On the other hand, an attacker inserted closely to the control node can disrupt almost all reports, but is easily located as such an attack is only possible from a small number of close-to-center locations.

In one embodiment, the source of data impairment can be ascertained by the control node by first identifying a valid portion and invalid portion of the received aggregate MAC, and then estimating a source of corruption of the received MAC based on indicia of which constituent MACs are included in the valid portion. In particular, if there are any constituent MACs that are wholly included in the valid portion, the control node may declare those MACs to be valid. The control node can then estimate (at least one) source of corruption by excluding nodes that could not have caused the corruption (e.g., at the left-most corrupted bit of the AggMAC stream).

Figure 4:
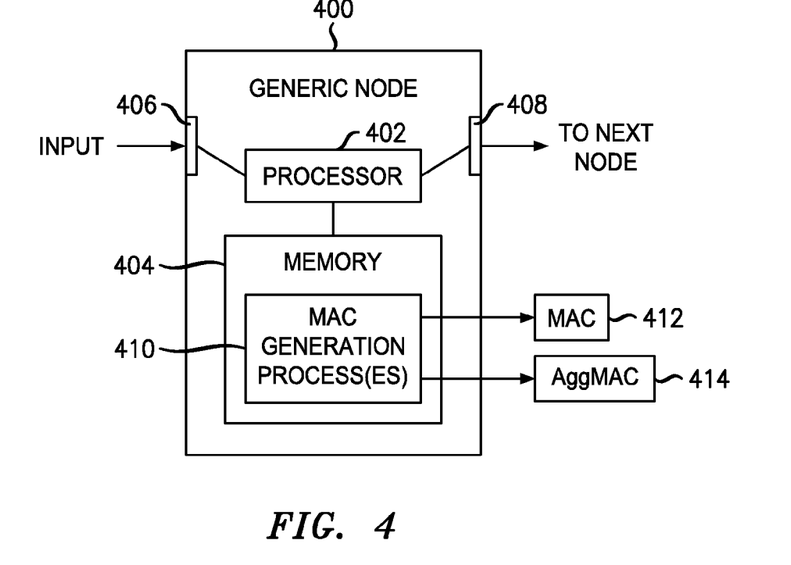
FIG. 4 is a block diagram illustrating a logical hardware configuration of a generic sending node in a multi-node data network.
Figure 5:
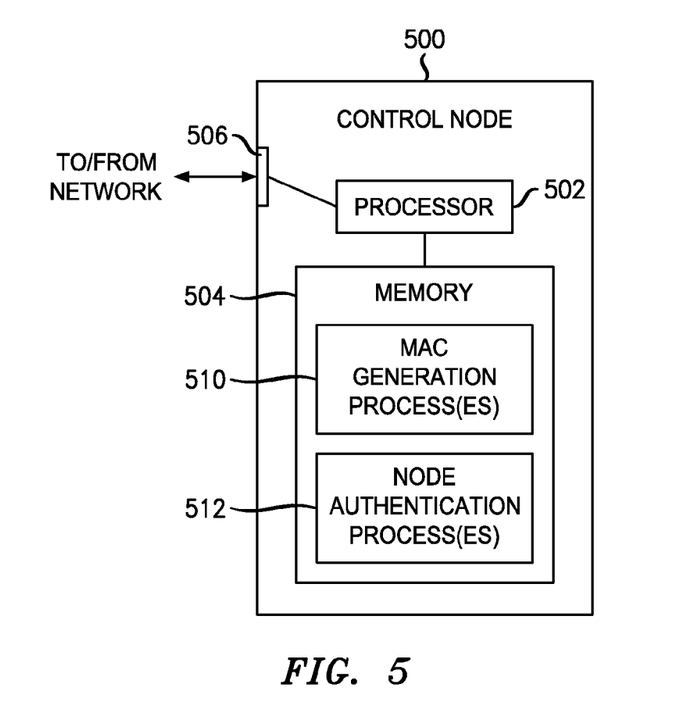
FIG. 5 is a block diagram illustrating a logical hardware configuration of a central node in a multi-node data network.

FIG. 4 and FIG. 5 illustrate a logical hardware configuration of a generic sending node 400 and a central node 500, respectively, in a multi-node data network according to embodiments of the present invention.

The generic node 400 comprises any system, server, application or function adapted to communicate data with other nodes of a multi-node data network 100. For example and without limitation, generic nodes may collectively comprise or be associated with multiple sensors deployed throughout a sensor network (such as a "Smart Grid" energy metering network), wherein each generic node nominally communicates payload data (e.g., sensor data or the like) and MAC tags to other nodes. The generic nodes may be arranged in virtually any type of network configuration, including linear, tree or star-based architectures or combinations thereof.

The generic node 400 includes a processor 402 and memory 404 for effecting communication transactions with other nodes and for generating MAC tags. The processor and memory are logically connected to an input interface 406 that receives inputs (e.g., payload data and MAC tags) from other node(s); and an output interface 408 that sends output (e.g., payload data and MAC tags) to other node(s). The logical hardware configuration further includes a MAC generation process module 410 for generating MAC tags. The MAC generation process module 410 may be implemented, for example and without limitation, by the processor 402 executing program code (e.g., including but not limited to operating system firmware/software and application software) stored in the memory 404 to generate MAC tags.

According to embodiments of the present invention, the MAC generation process module 410 is operable to generate two types of MAC tags: a "standard" MAC 412 (e.g., an AES-based tag, typically 128 bits) derived from the payload and a shared secret key; and an aggregate MAC ("AggMAC") derived by combining the MAC 412 with a MAC or AggMAC from a previous node using a MAC aggregation function. For example and without limitation, the AggMAC may be derived by a shifted-bitwise XOR operation such as described in relation to FIG. 3. As will be appreciated, the MAC generation process module 410 is a logical hardware component that may embody firmware, microchips (e.g., ASICs), software executable on a hardware device, hardware, specialized hardware, and/or the like, may be implemented in one or more physical devices and may implement one or more communication technologies including wired, wireless or packet-based links.

The control node 500 comprises any system, server, application or function adapted to receive, process and authenticate data from other nodes of a multi-node data network 100. For example and without limitation, the control node 500 may comprise an energy monitoring and/or billing system, server or application that receives, processes and authenticates payload data (e.g., sensor data or the like) and MAC tags received from one or more nodes.

The control node 500 includes a processor 502 and memory 504 for effecting communication with and for processing and authenticating data received from one or more generic nodes. The processor and memory are logically connected to a communication interface 506 that receives inputs (e.g., payload data and MAC tags) from other node(s); and may send outputs, where appropriate, to one or more node(s). The logical hardware configuration further includes a MAC generation process module 510 and a node authentication process module 512. The MAC generation process module 510 and node authentication process module 512 may be implemented, for example and without limitation, by the processor 502 executing program code (e.g., including but not limited to operating system firmware/software and application software) stored in the memory 504.

According to embodiments of the present invention, the MAC generation process module 510 operates (similarly as the MAC generation process module 410 of the generic nodes) to generate two types of MAC tags: "standard" MACs (comprising for example recomputed constituent MACs derived from the payload data of constituent nodes) and an aggregate MAC ("computed AggMAC") derived by executing a MAC aggregation function on the recomputed constituent MACs. For example and without limitation, the AggMAC may be derived by a shifted-bitwise XOR operation such as described in relation to FIG. 3. As noted in relation to FIG. 1, the control node computes AggMAC in the same sequence executed by the constituent nodes and therefore must have knowledge of the network topology.

In one embodiment, the node authentication process module 512 operates to authenticate respective "standard" MACs and/or received AggMAC. This is accomplished by comparing the computed AggMAC to the received AggMAC and, if they are the same, the received AggMAC is deemed valid and the constituent MACs from which the aggregate MAC was derived are known to be valid. But if they differ, the control node knows that some form of data impairment occurred in the network, either accidentally or maliciously. As described in relation to FIG. 3, the source of data impairment can be ascertained by the control node by first identifying a valid portion and invalid portion of the received aggregate MAC, and then estimating a source of corruption of the received MAC based on indicia of which constituent MACs, if any, are wholly included in the valid portion.

As will be appreciated, the MAC generation process module 510 and the node authentication process module 512 are logical hardware components that may embody firmware, microchips (e.g., ASICs), software executable on a hardware device, hardware, specialized hardware, and/or the like, may be implemented in one or more physical devices and may implement one or more communication technologies including wired, wireless or packet-based links.

Figure 6:
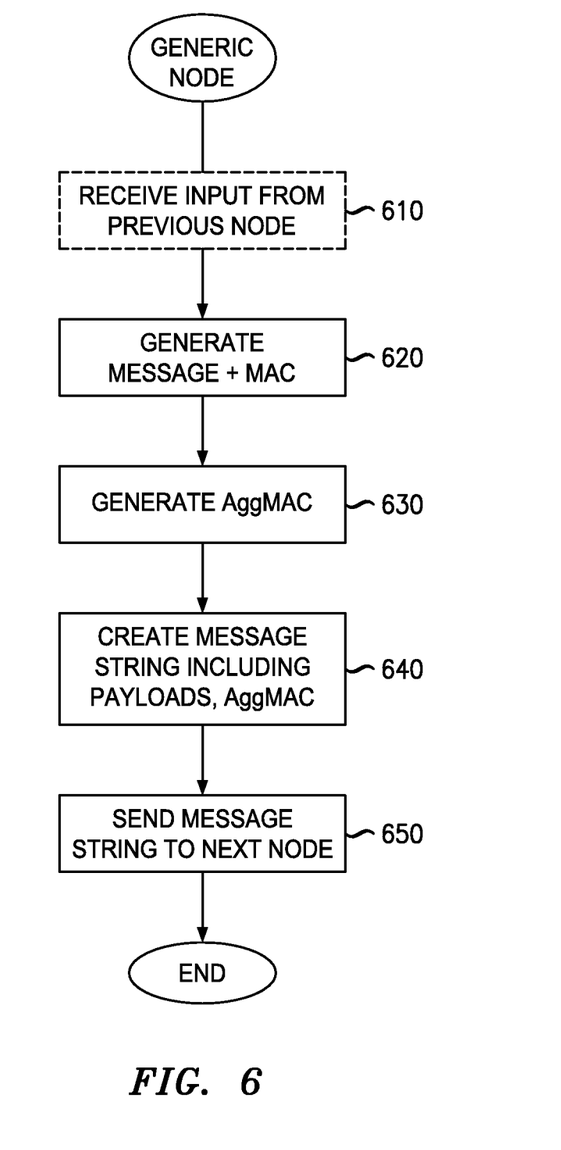
FIG. 6 is a flowchart showing steps performed by a generic sending node according to embodiments of the present invention.

FIG. 6 is a flowchart showing steps performed by a generic node 400 (FIG. 4) according to embodiments of the present invention. For convenience, the steps of FIG. 6 will be described with reference to a generic node (e.g., node 1, 2, 3, 4) operating within a linear network topology such as described in relation to FIG. 1. As will be appreciated, however, the steps of FIG. 6 may be performed by generic nodes in virtually any type of network topology.

At step 610, the generic node may optionally receive input from a previous node depending on its location within the network topology. For example, with reference to FIG. 1, intermediate nodes 3, 2 and 1 receive input from their respective previous nodes 4, 3 and 2; whereas node 4 is the initiating node and does not receive input from any previous nodes. In one embodiment, the input received by the intermediate nodes includes payload data from one or more previous nodes and a previous MAC (which depending on location within the network topology, may comprise a "standard" MAC or an aggregate MAC). For example, with reference to FIG. 1, node 3 receives payload data (msg 4) and a standard MAC (MAC 4) from node 4; node 2 receives payload data (msg 3, msg 4) and an aggregate MAC (AggMAC$_{34}$) from node 3; and node 1 receives payload data (msg 2, msg 3 and msg 4) and an aggregate MAC (AggMAC$_{234}$) from node 2.

At step 620, the generic node generates its own payload data and standard MAC. For example, with reference to FIG. 1, node 3 generates msg 3, node 2 generates msg 2 and node 1 generates msg 1; and each respective node generates its own standard MAC (e.g., using standard AES-based hash algorithms) based on its payload data and a shared secret key, to yield MAC 3, MAC 2 and MAC 1, respectively.

At step 630, the generic node generates an aggregate MAC, based on the MAC (or aggregate MAC) received from the previous node and the standard MAC generated by itself. For example, with reference to FIG. 1, node 3 generates AggMAC$_{34}$ based on an aggregation of MAC 3 with MAC 4; node 2 generates AggMAC$_{234}$ based on an aggregation of MAC 2 with AggMAC$_{34}$; and node 1 generates AggMAC$_{1234}$ based on an aggregation of MAC 1 with AggMAC$_{234}$. For example and without limitation, the respective AggMACs may be derived by a shifted-bitwise XOR operation such as described in relation to FIG. 3.

At step 640, the generic node creates a message string including payload data from itself (and, depending on its location within the network topology, from one or more previous nodes) and the aggregate MAC generated by itself. For example, with reference to FIG. 1, node 3 generates message string 108, node 2 generates message string 110 and node 1 generates message string 112, each of the message strings 108, 110, 112 including an aggregate MAC generated by the corresponding node.

Then, at step 650, the generic node sends the message string to the next consecutive node. For example, with reference to FIG. 1, node 3 sends message string 108 to node 2, node 2 sends message string 110 to node 1 and node 1 sends message string 112 to the control node. Thereafter, at each consecutive node, the received aggregate MAC is used to derive a next instance of aggregate MAC, or if the next consecutive node is the control node, it is used to authenticate data originated from the respective nodes, for example, such as described in relation to FIG. 5.

Figure 7:
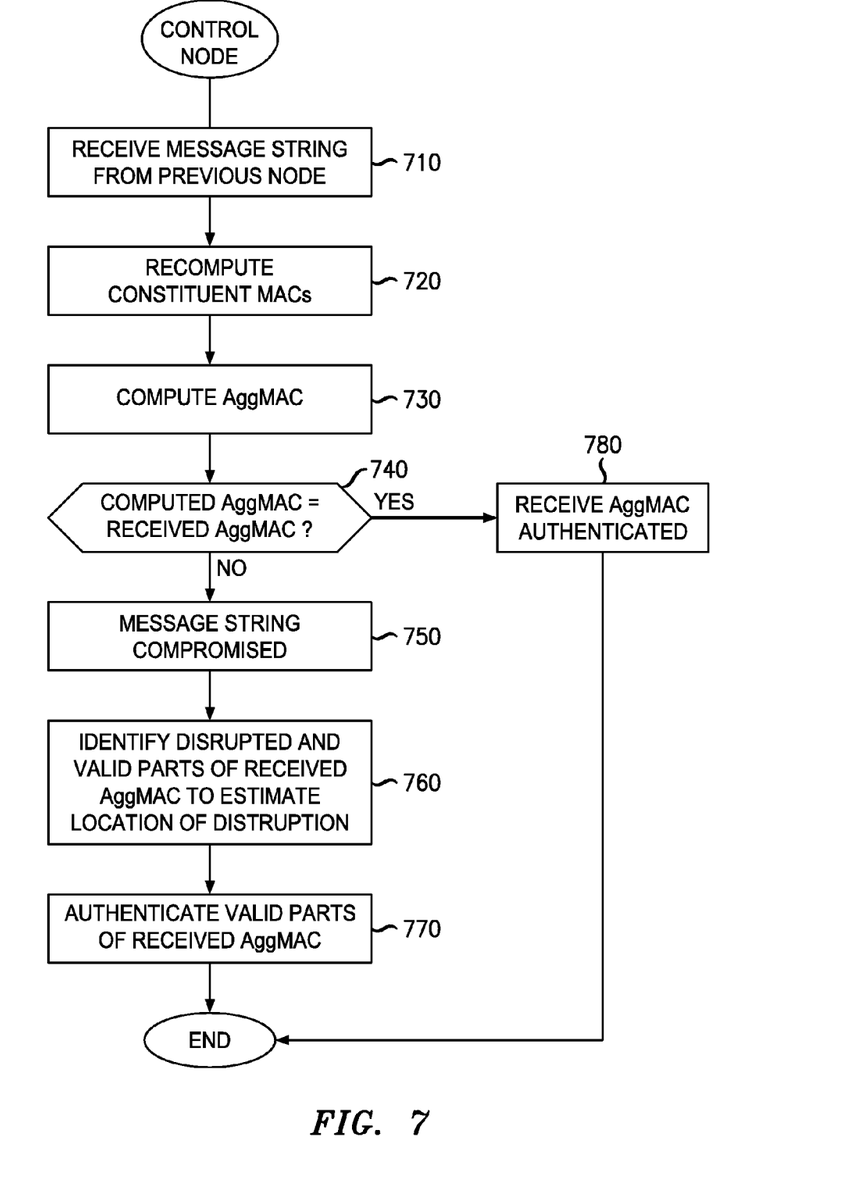
FIG. 7 is a flowchart showing steps performed by a central node according to embodiments of the present invention.

FIG. 7 is a flowchart showing steps performed by a control node 500 (FIG. 5) according to embodiments of the present invention. For convenience, the steps of FIG. 7 will be described with reference to the control node 104 operating within a linear network topology such as described in relation to FIG. 1. As will be appreciated, however, the steps of FIG. 7 may be performed by control node(s) in virtually any type of network topology.

At step 710, the control node receives a message string from a previous node. In one embodiment, the received message string includes payload data from one or more previous nodes and a previous MAC (which depending on the previous node's location within the network topology, may comprise a "standard" MAC or an aggregate MAC). For example, with reference to FIG. 1, the control node receives a message string 112 from node 1. The message string 112 includes payload data from 4 previous nodes (msg 1, msg 2, msg 3 and msg 4) and an aggregate MAC (AggMAC$_{1234}$) from node 1.

At step 720, the control node recomputes constituent MACs of the previous nodes that contributed to the message string. For example, with reference to FIG. 1, the control node recomputes constituent MACs of nodes 1, 2, 3 and 4 based on the payload data (msg 1, msg 2, msg 3 and msg 4) and respective shared secret keys associated with the constituent nodes, yielding recomputed MACs (MAC 1, MAC 2, MAC 3 and MAC 4).

At step 730, the control node computes an aggregate MAC ("computed AggMAC") derived by executing a MAC aggregation function on the recomputed constituent MACs. For example, with reference to FIG. 1, the control node computes AggMAC$_{1234}$ by successively executing a MAC aggregation function on recomputed MACs (MAC 1, MAC 2, MAC 3 and MAC 4) of the constituent nodes. For example and without limitation, the computed AggMAC may be derived by a shifted-bitwise XOR operation such as described in relation to FIG. 3.

At step 740, the control node compares the computed AggMAC to the received AggMAC to determine an authentication status of the received AggMAC. If the computed and received AggMACs are the same, the process proceeds to step 780 whereby the received AggMAC is authenticated as valid and the constituent MACs contributing to the received AggMAC are known to be valid. But if they differ, the control node knows that some form of data impairment occurred in the network and the message string is deemed to have been compromised at step 750.

Having determined that the message string is compromised, the control node at step 760 identifies disrupted and valid parts of the received AggMAC to estimate the location of the disruption. For example, as described in relation to FIG. 3, the source of data impairment can be ascertained by the control node by first identifying a valid portion and invalid portion of the received aggregate MAC, and then estimating a source of corruption of the received MAC based on indicia of which constituent MACs, if any, are wholly included in the valid portion. At step 770, the control node declares valid any constituent MACs that are wholly included in the valid portion.

FIGS. 1-7 and the foregoing description depict specific exemplary embodiments of the invention to teach those skilled in the art how to make and use the invention. The described embodiments are to be considered in all respects only as illustrative and not restrictive. The present invention may be embodied in other specific forms without departing from the scope of the invention which is indicated by the appended claims. All changes that come within the meaning and range of equivalency of the claims are to be embraced within their scope.

For example, embodiments of the MAC aggregation function has been described herein with reference to a linear network topology and a MAC aggregation function based on a shifted-XOR operation, whereby MAC aggregation is accomplished by shift XOR-ing individual MACs of constituent nodes to the aggregate in sequential fashion. However, it will be appreciated that embodiments of the present invention may be implemented in any number of alternative network topologies and/or with any number of alternative MAC aggregation operations.

For example and without limitation, embodiments described herein may be implemented in a "tree" topology, whereby MAC aggregation is accomplished in at least one instance by a gateway node combining two aggregate MACs received from different branches; or a combination of tree topology with linear branches.

Moreover, MAC aggregation may be accomplished by a much larger class of functions, instead of just a shifted-bitwise-XOR of the components. Generally, the security holds for any efficiently computable function that is one-to-one on its components. (A function is invective or one-to-one if every element of the function's range is mapped to by at most one element of its domain. Further, the function is one-to-one on its components if it is one-to-one when all but one of its component inputs are fixed. For example, a three-component function, f (x, y, z) is one-to-one on its components if functions f (*, y, z), f (x, *, z) and f (x, y, * are one-to-one for every fixed string x, y and z.).

What is claimed is:

1. In a communication network including a plurality of successive sending nodes operably linked to a control node, a method, carried out by at least one sending node, comprising:
   receiving from a previous node a first message authentication code (MAC);
   generating a second message authentication code (MAC);
   executing a MAC aggregation function to combine the first and second MACs, defining constituent MACs, yielding an aggregate MAC shorter than the concatenation of the constituent MACs, wherein the MAC aggregation function comprises a shifted bitwise XOR operation performed on corresponding bits of:
   the first MAC; and
   the second MAC, after having shifted the second MAC by s bits; and
   sending the aggregate MAC to a next consecutive node for use in deriving a next instance of aggregate MAC, or if the next consecutive node is the control node, for use in authenticating data originated from the sending nodes.

2. The method of claim 1, wherein the first MAC comprises:
   an individual MAC, if the previous node is a first successive sending node; or
   an aggregate MAC, if the previous node is an intermediate sending node.

3. Apparatus for performing MAC aggregation of constituent MACs, in accordance with a communication network including a plurality of successive sending nodes operably linked to a control node, the apparatus at at least one sending node comprising:
   an input interface;
   an output interface;
   a memory; and
   at least one processor operably coupled to the input interface, output interface and memory and configured to:
   (a) receive from a previous node a first message authentication code (MAC);
   (b) generate a second message authentication code (MAC);
   (c) execute a MAC aggregation function to combine the first and second MACs, defining constituent MACs, yielding an aggregate MAC shorter than the concatenation of the constituent MACs, wherein the MAC aggregation function comprises a shifted bitwise XOR operation performed on corresponding bits of:
   the first MAC; and
   the second MAC, after having shifted the second MAC by s bits; and
   (d) send the aggregate MAC to a next consecutive node for use in deriving a next instance of aggregate MAC, or if the next consecutive node is the control node, for use in authenticating data originated from the sending nodes.

4. A method comprising:
   receiving from a first node a first message authentication code (MAC);
   receiving from a second node a second message authentication code (MAC);
   executing a MAC aggregation function to combine the first and second MACs, defining constituent MACs, yielding an aggregate MAC shorter than the concatenation of the constituent MACs, wherein the MAC aggregation function comprises a shifted bitwise XOR operation performed on corresponding bits of:
the first MAC; and
the second MAC, after having shifted the second MAC by s bits.

5. The method of claim 4, wherein the first and second MACs comprise aggregate MACs.

6. In a communication network including a plurality of sending nodes operably linked to a control node, a method, carried out by the control node, comprising:
receiving from a previous node a message string including payload data from a plurality of sending nodes and at least one aggregate MAC computed by aggregating a plurality of constituent MACs generated by the respective sending nodes;
executing a MAC computation function to recompute the constituent MACs from the payload data and one or more shared secret keys, yielding a plurality of recomputed constituent MACs;
executing a MAC aggregation function on the recomputed constituent MACs, yielding a computed aggregate MAC shorter than the concatenation of the recomputed constituent MACs; wherein the MAC aggregation function comprises a shifted bitwise XOR operation performed successive instances of constituent MACs, after having shifted the successive instances by s bits;
comparing the computed aggregate MAC to the received aggregate MAC to determine an authentication status of the received aggregate MAC;
if the computed aggregate MAC is not equal to the received aggregate MAC:
identifying a valid portion and an invalid portion of the received aggregate MAC;
estimating a source of corruption of the received aggregate MAC, based on indicia of which constituent MACs are included in the valid portion; and
declaring valid the constituent MACs that are wholly included in the valid portion.

7. The method of claim 6, wherein the MAC aggregation function is defined by any function that is one-to-one on its components.

8. Apparatus for performing MAC aggregation of constituent MACs, in accordance with a communication network including a plurality of successive sending nodes operably linked to a control node, the apparatus at the control node comprising:
a communication interface;
a memory; and
at least one processor operably coupled to the communication interface and memory and configured to:
(a) receive from a previous node a message string including payload data from a plurality of sending nodes and at least one aggregate MAC computed by aggregating a plurality of constituent MACs generated by the respective sending nodes;
(b) execute a MAC computation function to recompute the constituent MACs from the payload data and one or more shared secret keys, yielding a plurality of recomputed constituent MACs;
(c) execute a MAC aggregation function on the recomputed constituent MACs, yielding a computed aggregate MAC shorter than the concatenation of the recomputed constituent MACs, wherein the MAC aggregation function comprises a shifted bitwise XOR operation performed successive instances of constituent MACs, after having shifted the successive instances by s bits;
(d) compare the computed aggregate MAC to the received aggregate MAC to determine an authentication status of the received aggregate MAC;
(e) if the computed aggregate MAC is not equal to the received aggregate MAC:
(e1) identify a valid portion and an invalid portion of the received aggregate MAC;
(e2) estimate a source of corruption of the received aggregate MAC, based on indicia of which constituent MACs are included in the valid portion; and
(e3) declare valid the constituent MACs that are wholly included in the valid portion.

* * * * *